Dec. 5, 1950 W. A. KNOOP 2,532,723
SERVOMOTOR CIRCUIT

Filed Oct. 10, 1946 3 Sheets-Sheet 1

INVENTOR
W. A. KNOOP
BY
D. MacKenzie
AGENT

Dec. 5, 1950 W. A. KNOOP 2,532,723
SERVOMOTOR CIRCUIT
Filed Oct. 10, 1946 3 Sheets-Sheet 2

INVENTOR
W. A. KNOOP
BY
D. MacKenzie
AGENT

Dec. 5, 1950  W. A. KNOOP  2,532,723
SERVOMOTOR CIRCUIT

Filed Oct. 10, 1946  3 Sheets-Sheet 3

INVENTOR
W. A. KNOOP
BY D. MacKenzie
AGENT

Patented Dec. 5, 1950

2,532,723

UNITED STATES PATENT OFFICE 2,532,723

SERVOMOTOR CIRCUIT

William A. Knoop, Summit, N. J., assignor to Bell Telephone Laboratories, Incorporated, New York, N. Y., a corporation of New York Application October 10, 1946, Serial No. 702,442

14 Claims. (Cl. 318—29)

This invention relates to an improvement in servomotor control circuits, especially useful where it is important to eliminate the effects of friction and backlash in gear trains and to avoid hunting about a null position.

It is well known to the prior art to use a servomotor to bring about equality of a local with a distant voltage, the local voltage varying for example with the position of a shaft which the motor is called on to drive in correspondence with a condition represented by the distant voltage. It is also known to control the motor through the armature of a relay provided with a front and a back contact and having two windings of which the first is traversed by an error current corresponding to the voltage difference to be annulled. Depending on the direction of flow of this current, the armature rests on one or the other of the contacts, thereby determining the direction of rotation of the motor. At the same time, the second relay winding is supplied with alternating current of convenient frequency and value which is swamped by the error current except when the motor shaft is near its null position. At this position, the armature is controlled by the alternating current, its purpose being to keep the bearing friction nascent by causing oscillations of the motor.

However, it frequently happens in such cases that the friction is great enough to cause the motor to stop short of the true null position and refuse to oscillate thereabout, as well as refuse to restart unless the error current is of substantial magnitude. There results an interval on each side of the balance position in which the motor fails to follow the error current. If the friction is reduced by permitting backlash in the motor-driven gears, there results again an uncertain indication of the null position.

These difficulties are avoided by the present invention wherein the alternating current in the second relay winding is replaced by a direct current caused, by the motion of the motor itself at the null position, to oscillate between two values respectively above and below an intermediate value. It is found that by the arrangement to be described the motor may be driven with full power to the true null position, there being no oscillation of current in the second winding until this position is reached. About this position the motor then is caused to oscillate over a conveniently narrow range, friction is kept nascent, the motor is prepared to respond to a new demand and hunting is at once checked.

It is therefore an object of the invention to provide for a servomotor a control circuit capable of the operation indicated just above. Other advantages and objects attainable by the invention will appear from a reading of the following description thereof, with reference to the accompanying drawings, in which.

Figure 2:
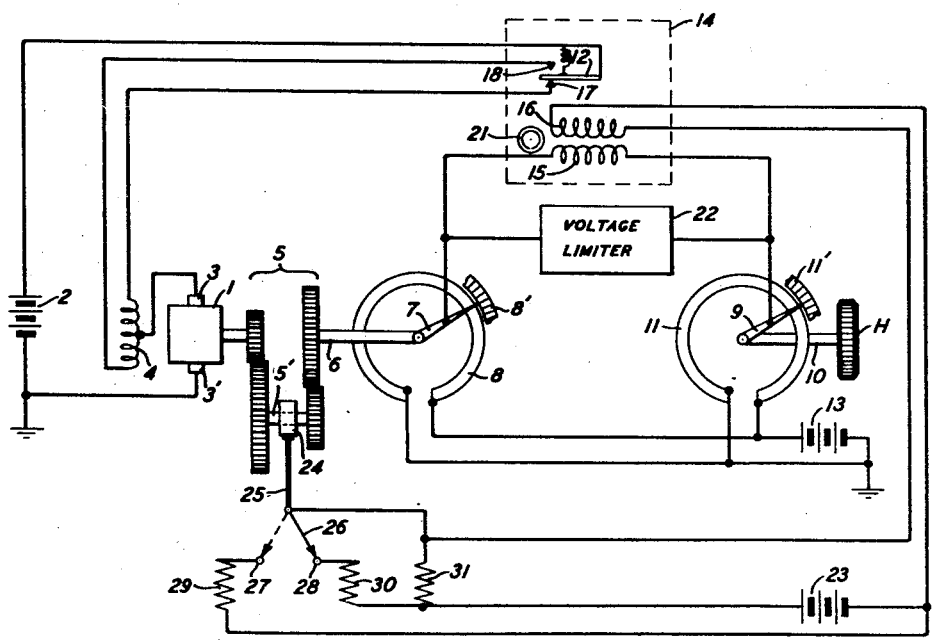
Fig. 2 is a diagram of the motor control circuit of the invention in its simplest form.
Figure 5:
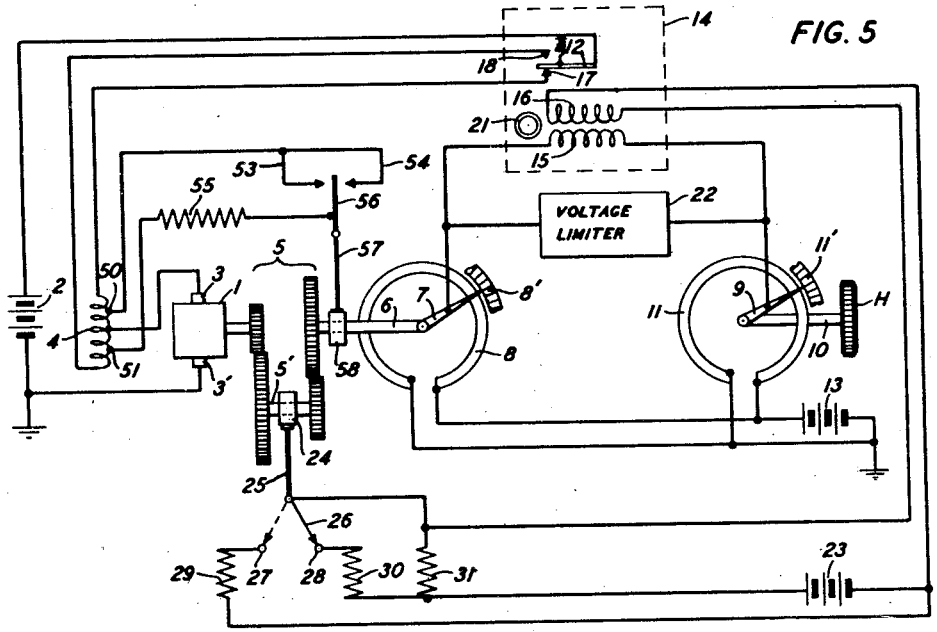
Figure 6:
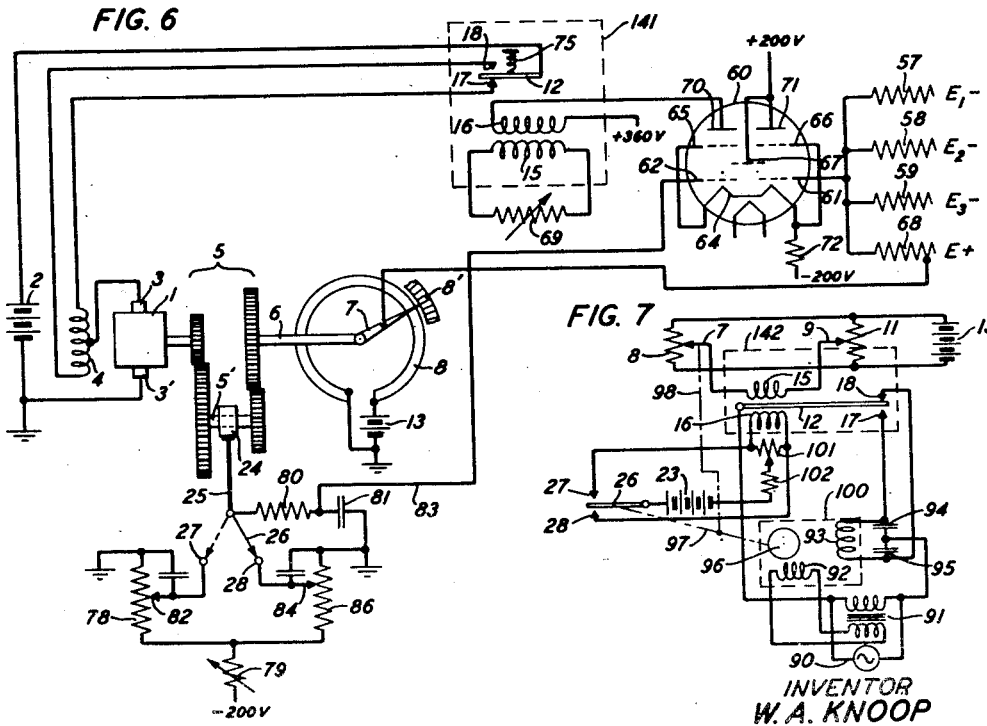
Figure 7:
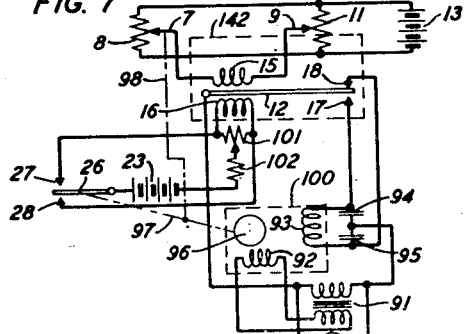

Fig. 5 exhibits another modification of the circuit of Fig. 2;

Fig. 6 is a diagram of an adaptation of the invention to the case of balancing the input voltages to a summing amplifier, and Fig. 7 schematically shows the invention applied to the control of an alternating current motor.

In all figures, like elements are identified by like numerals or letters.

Figure 1:
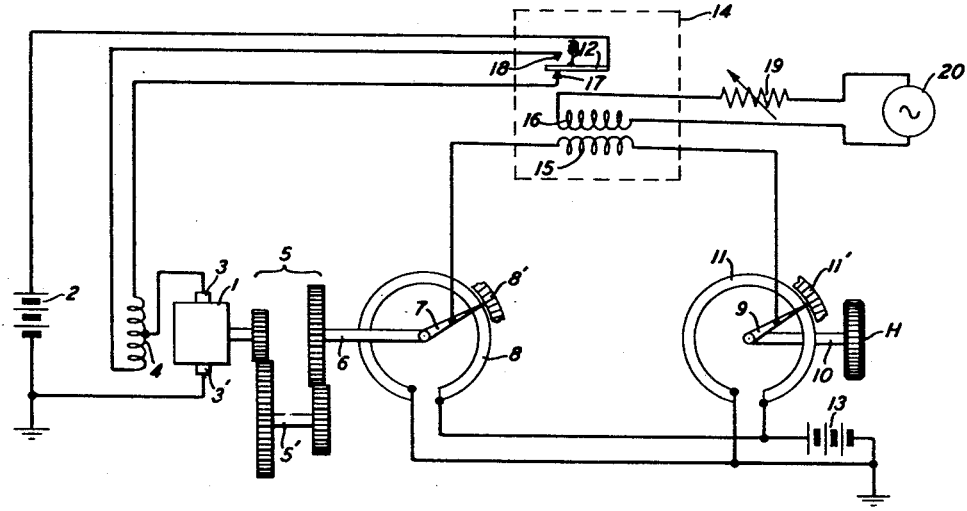
Fig. 1 is a diagram of a motor control circuit known to the prior art.

A description of the operation of a circuit known to the prior art will facilitate the understanding of the improvement thereover made by the present invention. Such a known arrangement is illustrated in Fig. 1, in which motor 1 is a direct current series field motor supplied with power from a source such as battery 2. Terminals 3 and 3' of the armature winding of motor 1 are in series with battery 2 and with one or the other half of the series field winding 4 depending on the position of armature 12 of a relay generally indicated by numeral 14. Relay 14 may conveniently be a Western Electric 267—A relay, a non-polar relay provided with a permalloy core (not shown) surrounded by a primary winding 15 and a secondary winding 16. Obedient to the currents in these windings, armature 12 adheres to one of contacts 17, 18. In the situation shown in Fig. 1, armature 12 rests on contact 17 and the upper portion of field winding 4 is in series with the armature winding of motor 1.

Secondary winding 16 of relay 14 is traversed by an alternating current of any convenient frequency supplied by source 20. Primary winding 15 is traversed by a current corresponding to the voltage difference which is to be reduced to zero by the operation of motor 1. In the simple case chosen for illustration, this voltage difference is that between brushes 7 and 8 on potentiometers 8 and 11, respectively, which are in parallel across battery 13. One may consider that brush 9 is positioned on potentiometer 11 through shaft 10 by manipulation of handwheel H, and that brush 7 is to be driven by motor 1 to a corresponding position on potentiometer 8. Motor 1 drives through gearing, generally indicated by the numeral 5, shaft 6 to which is attached brush 7. It is to be understood that brushes 7 and 9 are insulated from their respective shafts 6 and 10.

It is apparent that winding 15 is in the galvanometer diagonal of a Wheatstone bridge of which the arms are constituted by the portions into which potentiometers 8 and 11 are divided by brushes 7 and 9. Brushes 7 and 9 are shown extended to permit readings of their positions on scales 8' and 11', respectively. When the bridge is balanced, the readings on scales 8' and 11' are the same but it will be understood that any other relation may be chosen. For example, shaft 10 may move in correspondence with the rudder of a vessel, and brush 7 may be a pointer indicating on scale 8' the rudder angle when the bridge is balanced. It will be understood that handwheel H symbolizes any mechanism which produces rotation of shaft 10 and that any desired agency may be controlled by shaft 6, while voltage source 13 may be at a distance.

A voltage difference between brushes 7 and 9 results in a current in primary winding 15 which, when large enough, magnetically swamps the alternating current in secondary winding 16 and holds armature 12 steadily on contact 17. The connections to the armature of motor 1 are of course so made that the motor shall drive brush 7 toward a position on potentiometer 8 where the voltage difference is zero. In the immediate neighborhood of the balance point, the alternating current in winding 16 gives rise to oscillation of armature 12 between contacts 17 and 18, and thus to an oscillation of the shaft of motor 1.

It is found, however, that because of the joint action of the alternating current in winding 16 and the direct current in winding 15, when armature 12 is so vibrated in the neighborhood of the balance point, although the motor continues to move toward balance the torque driving it is rapidly reduced and friction rises to bring the motor to a stop before exact balance. Besides, it will not start again until the unbalance voltage exceeds a threshold value. Friction may be reduced by permitting backlash in the gear train 5, but then oscillations of the motor result without attainment of the exact balance point.

To overcome the effect of friction by utilizing these oscillations of the motor shaft and at the same time maintain the motor torque undiminished up to the balance point, and to annul the effect of backlash in gears 5 by making the mid-point of the backlash movement become the point of balance, are the objects achieved by introducing according to the invention the modification shown in Fig. 2. Here alternating current source 20 is replaced by direct current source 23 which is arranged to supply winding 16 with a direct current controlled to three distinct values by the operation of the motor itself.

As shown in Fig. 2, battery 23 is connected at one terminal to one end of winding 16 and also to a resistance 29. The other terminal of battery 23 is through resistance 31 permanently connected to the other end of winding 16. Resistance 30 is connected to battery 23 at the point of connection thereto of resistance 31. The free ends of resistances 29 and 30 are led to contact terminals 27 and 28 respectively, between which takes place the movement of switch arm 26. Arm 26 on terminal 28 connects resistance 30 in parallel with resistance 31 and so increases the current in winding 16 from its value when arm 26 is in mid position. On terminal 27, arm 26 connects resistance 29 in shunt with winding 16 and so decreases the current in winding 16 below its mid value. By suitable choice of these three resistances 29, 30 and 31 the current changes each way are made equal and each separately a little more than enough to shift armature 12 from the contact on which it rested before the current change took place. Relay 14 is so connected that a change in the current in the secondary winding always moves armature 12 off the contact it rested on. The movement of arm 26 is controlled by a tongue 25 mounted on a collar 24, slippingly fitted on stub shaft 5' between the two pairs of gears 5.

While, in order to simplify the showings of the various embodiments of the invention, the electrical sources 2, 13, 23 have, as usual, been shown as separate batteries, it is, of course, obvious that a common source, or two sources, may replace these three sources.

Consider the operation of the system when motor 1 is at the balance position. By preliminary adjustment, it is arranged that when armature 12 rests on contact 17, as shown in Fig. 2, arm 26 is initially on terminal 28. Current then flows from battery 2 through the upper half of field winding 4 so driving motor 1 that collar 24 shifts arm 26 to terminal 27 decreasing thereby the current in secondary winding 16 and so causing armature 12 to move to contact 18. The motor then reverses, and while arm 26 is in mid position the current in winding 16 has its intermediate value. The motor continues in reversed motion until arm 26 returns to terminal 28; the current in winding 16 then increases by a change sufficient to return armature 12 to contact 17 and the motor again reverses. When armature 12 is on contact 17, the current in winding 16 is a maximum. Spring 75 operates to shift armature 12 to contact 18 when the current in winding 16 is a minimum.

With this arrangement the motor oscillates about the true balance point at a frequency determined by its own circuit and moment of inertia and through an excursion each side of balance determined by the backlash in the gear train and the spacing of terminals 27, 28. Such oscillations may be at a rate of forty or fifty per second and continue as long as no current flows in primary winding 15.

When brushes 7 and 9 are at different potentials, that of 9 being higher by reason of movement of shaft 10, current flows in winding 15 to aid magnetically the current in winding 16. The relay connection is such that this larger current holds armature 12 on contact 17, keeping the current in winding 16 a minimum because the motor now moves arm 26 to terminal 27. The field current of motor 1 is now in the upper half of field 4 and it has been arranged in initial adjustment of the apparatus that the motor movement which results in moving brush 7 to a higher potential shall throw arm 26 to terminal 27 when armature 12 moves to contact 18. Motor 1 continues to move with full power from battery 2 until balance is so near that the combined magnetic fields of windings 15 and 16 fall to release armature 12. The proper choice of elements in the current supply circuit to winding 16 insures that the release of armature 12 from contact 17 to contact 18 shall occur just as the current in winding 15 falls to zero, and the motor reverses as above explained. The slight overshoot of brush 7 is remedied on this reversal, and oscillation of the motor about the balance position begins. An opposite unbalance of brushes 7 and 9 produces opposite changes, again leading to a restored balance about which the motor oscillates.

The invention in its embodiment shown in Fig. 2, provides an oscillation of motor 1 between limits defined by the backlash in the gears driving stub shaft 5' and centered about the balance position. Friction is thus lessened by being kept nascent and the effect of backlash is actually to preserve the readiness of the motor to respond to a change in the quantity to be followed; in the illustration, the angular position of shaft 19.

A sudden large movement of shaft 19 could cause a current in winding 15 enough to reverse the magnetization of the relay core. This is prevented by shunting winding 16 with a voltage limiter 22, which may be of any known design, an example being the limting circuit described in United States Patent 1,825,304, September 29, 1931, to C. I. Burnside. In addition, too rapid a change of flux in the relay core is prevented by providing a short-circuited turn 21, which may be a copper ring surrounding the core in a convenient place.

The full voltage of battery 2 is applied to the motor as balance is approached, so that full torque is developed up to the balance point and is available to respond to an upset in the balance due to a new position of shaft 19. The battery voltage continues to be applied during the oscillation about balance. On reversal the current in the motor windings is heavy and may overheat the motor if oscillation is long continued.

Figure 3:
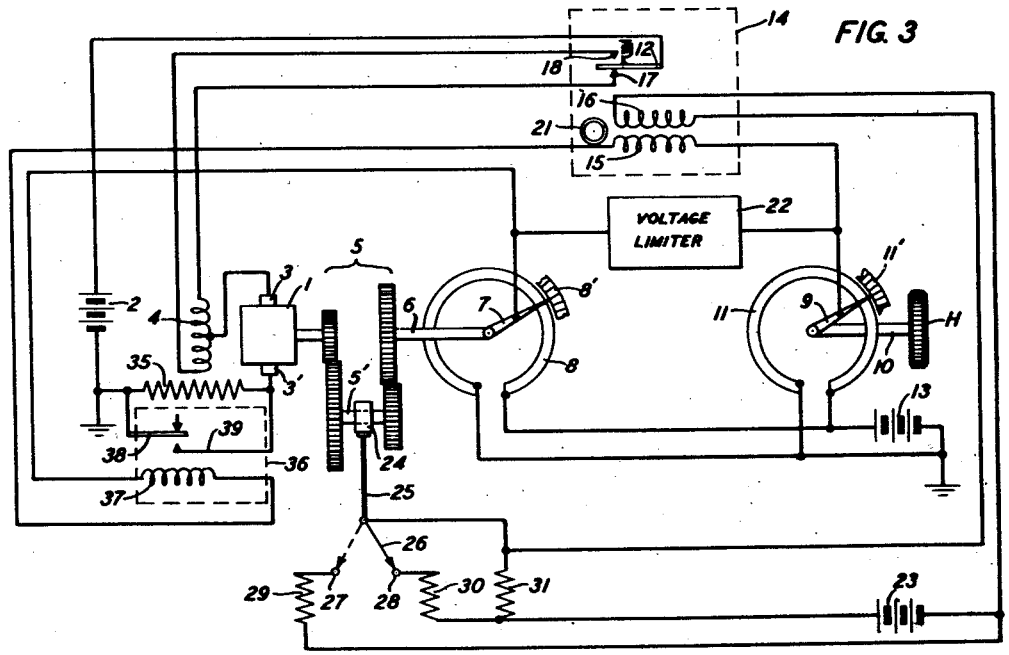
Fig. 3 is a diagram of the circuit of Fig. 2 modified to avoid undue heating of the motor at the null position.

In Fig. 3, the circuit of Fig. 2 is modified to reduce the voltage applied to the motor when oscillating and restore the full voltage when an unbalance between brushes 7 and 9 is present. Between the grounded terminal of battery 2 and armature terminal 3' is introduced resistance 35. A relay 36 has its winding 37 in series between brush 7 and winding 15 of relay 14. When current flows in windings 15 and 37, grounded armature 38 of relay 36 is operated to contact 39 connected to motor terminal 3'. This arrangement reduces, by the voltage drop across resistance 35, the voltage on motor 1 when it is oscillating about the balance point, and shorts resistance 35 when there is an unbalance current in winding 15. The inclusion of resistance 35 reduces the frequency of oscillation, but for most purposes such reduction is harmless.

Figure 4:
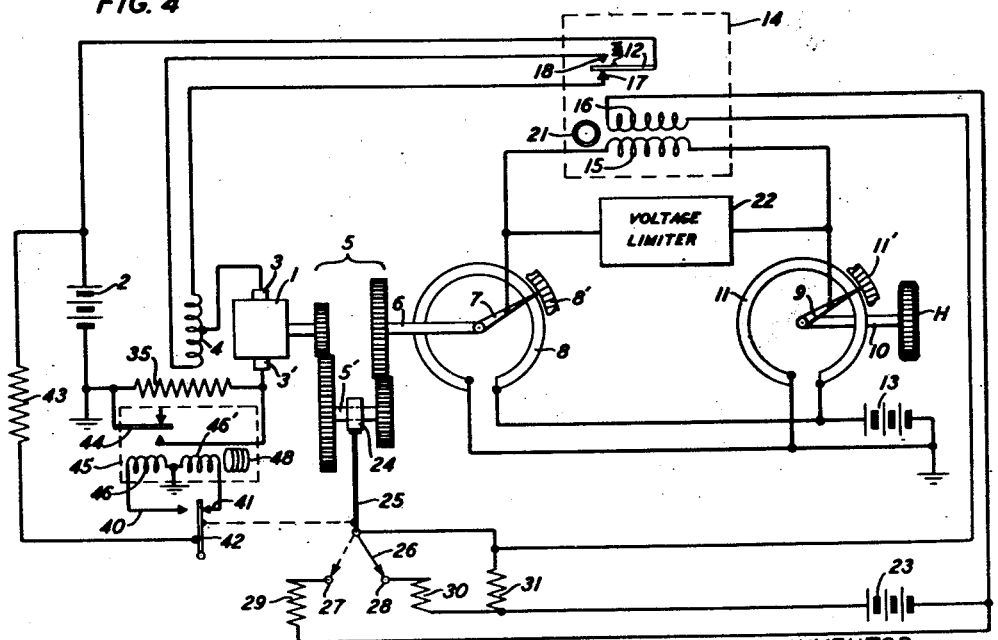
Fig. 4 is a diagram of a further modification of the circuit of Fig. 2.

Instead of relay 36 having winding 37 in series with the winding 15 as in Fig. 3, a relay separately controlled may be used as in Fig. 4. Here relay 45 has a pair of windings 46, 46' of which the junction is grounded and the terminals are respectively connected to switch points 40 and 41. Between these switch points a swinger 42 is operated by a suitable connection to arm 25. Swinger 42 is connected through resistance 43 to the ungrounded terminal of battery 2. As arm 25 vibrates to shift the contact 26 back and forth between terminals 27 and 28, swinger 42 vibrates between switch points 40 and 41 so that current flows alternately through windings 46 and 46' to ground. In either case, armature 44 would be operated to short resistance 35 were it not for a heavy short-circuiting turn 48 which prevents the relay operation while swinger 42 is in oscillation. An unbalance voltage between brushes 7 and 9, driving motor 1, causes arm 25 and with it swinger 42 to rest on one side or the other of their respective limits and the resulting steady magnetization of the core of relay 45 operates armature 44.

A disadvantage of the arrangement of either Fig. 3 or Fig. 4 is the reduced torque immediately available to follow a repositioning of brush 9; the torque is reduced because of added resistance in the armature circuit during oscillation. This disadvantage may be obviated, without incurring that of unduly heating the motor during oscillation, by a different modification of the circuit of Fig. 2.

In Fig. 5, the circuit of Fig. 2 is repeated with the addition of selected taps one in each division of the field winding, across which is shunted a resistor except during oscillation of the motor. Taps 50 and 51, on the upper and lower halves of field winding 4, respectively, are connected one to both of the opposed contacts 53 and 54, the other through resistance 55 to a swinger 56 which, on touching either 53 or 54, places resistance 55 in shunt with the portion of winding 4 included between taps 50 and 51. Swinger 56 is operated left or right between contacts 53 and 54 by an arm 57 driven by slippingly fitted collar 58 on shaft 6. Shaft 6 is more slowly moving than stub shaft 5' and the spacing of contacts 53, 54 is made such that, during the motor oscillation which alternates arm 26 between contacts 27, 28, swinger 56 shall float between contacts 53, 54 without touching either. This is the condition at balance; motor field strength and torque are high, the entire motor field is in circuit, so the armature current is low although the speed is also low. However, when an unbalance current in winding 15 of relay 14 calls on the motor to move for a time steadily in one direction, swinger 56 moves to one or the other of contacts 53, 54, shunts the central part of field winding 4, thereby weakening the motor field and speeding up the motor. Thus high control torque is made available succeeded by high speed during rebalancing, in addition to reduced power consumption during oscillation, without requiring the auxiliary relays of Figs. 3 and 4.

In Fig. 6 is shown a circuit applying the invention to the case where motor 1 is called on so to position shaft 6 that brush 7 provides a voltage E balancing the sum of negative voltages of magnitudes $E_1$, $E_2$ and $E_3$ on the input of a summing amplifier, thereby solving for E the equation $E - E_1 - E_2 - E_3 = 0$. The voltages $E_1$ to $E_3$ may be those derived from a bombsight computer, for example, and apparatus (not shown) controlled by shaft 6 may be required to assume a condition representative of the sum of these voltages.

The voltages to be balanced are applied together through resistors 57, 58 and 59, respectively, to control grid 61 of tube 60, which is suitably a 12L8-GT, a double pentode having common cathode 64, control grids 61 and 62, suppressor grids 65 and 66 connected to cathode 64, screen grid 67 and anodes 70 and 71. Cathode 64 is connected through resistance 72 to −200 volts, while screen grid 67 and anode 71 are jointly supplied from +200 volts. The input circuit of the right half of tube 60 thus receives the voltages $E_1$, $E_2$, $E_3$ and balancing voltage $E$ supplied through resistor 68 from brush 7.

Resistance 72, connected to —200 volts, is chosen such that in the absence of voltages externally applied to grids 61 and 62, these grids are nearly at ground potential. The conductances of the two pentodes in tube 60 are arranged to be such that for a small negative voltage on grid 62 and an equal positive voltage on grid 61, current flow in winding 16 leaves armature 12 on contact 18 and motor 1 is being driven to reduce the voltage at brush 7, thereby moving toward the balance position. During this motion of motor 1, collar 24 and arm 25 hold switch arm 26 on contact 28.

The operation of motor 1 is again controlled on the way to and at balance by the functioning of armature 12 of relay 141. Relay 141 is identical with relay 14 of the previous figures, except that winding 16 is connected between +360 volts and anode 70 of tube 60, while winding 15 is shunted by variable resistor 69 which thus serves to make winding 15 an adjustable damping winding. Winding 16 is thus traversed by the output current of the summing amplifier and this current is at balance just sufficient to hold armature 12 against contact 17, against spring 75. By suitable choice of resistance 72 it may be arranged that at balance, when the input voltages sum to zero, the current from anode 70 has the proper value for the purpose of so holding armature 12. Further, the connections of motor 1 are so made that this situation of armature 12 corresponds to a field current tending to drive motor 1 beyond the balance point. The voltages +360, +200 and —200 are conveniently obtained from a single power supply. It may be shown that the voltage at anode 70 is proportional to the algebraic difference between the sum voltage at grid 61 and the voltage at grid 62. Let it be assumed that in Fig. 6 motor 1 has driven shaft 6 to the balance position, armature 12 being on contact 17 and arm 26 being thrown right as shown in the figure.

Oscillation of motor 1 about the balance point is here effected by producing, as a result of the movement of switch arm 26, a step variation in the voltage of grid 62. Switch arm 26 is driven through collar 24 and arm 25 between contacts 27 and 28 as in the circuits shown in Figs. 2 to 5. Contact 28 is connected to a point on potentiometer 86, which is connected between ground and —200 volts in series with adjustable resistance 79. Switch arm 26 is also connected to ground through resistance 80 and condenser 81 in series.

While switch arm 26 is on contact 28, condenser 81 is charged through resistance 80 from the negative voltage on potentiometer 86 to which contact 28 is connected by tap 84. This tap is so placed that the voltage of condenser 81, applied via conductor 83 to grid 62 is, when the voltage on grid 61 is zero, sufficient to reduce the current in winding 16 by the amount needed to cause armature 12 to move from contact 17 to contact 18, thereby causing motor 1 to reverse its rotation. As before, a shift of armature 12 accompanies a change in current through winding 16.

As shaft 6 reaches the balance position and is carried very slightly past it by the inertia of motor 1, the voltage of condenser 81 takes control of the output current of tube 60, armature 12 shifts to contact 17 and motor 1 reverses to throw switch arm 26 to contact 27. Condenser 81 holds its charge while switch arm 26 is on neither contact.

Contact 27 is by tap 82 connected to a point on potentiometer 78, similar to potentiometer 86 and similarly connected to ground and —200 volts. The point of contact of tap 84 corresponds to a lower negative potential than that of tap 82, wherefore when switch arm 26 moves to contact 28, condenser 81 discharges to the lower negative voltage. Thereby the current in winding 16 is allowed to increase and armature 12 returns to contact 18, again reversing motor 1. Oscillation of the motor about the position of balance is here brought about by the alternate steps in voltage of grid 62 with the accompanying current steps in winding 16. On either side of the balance point, the motor rotation is controlled by the net voltage on grid 61. This net voltage is an error voltage producing an error current in winding 16. That winding here combines the functions divided in the earlier figures, between windings 16 and 15. The identity with the previously described circuits lies in the fact that, in all, it is the magnetization of the relay core which is varied to effect alternation of armature 12 between contacts 17 and 18.

In all the modifications of the invention thus far described, the oscillation of the relay armature has had the effect of reversing the field flux of the motor, leaving the direction of flow of armature current unchanged. It is therefore clear that the invention is not limited in its application to the case of a series-wound motor, but may readily be used with a shunt-wound motor with no change from the operation already described. The relay shown is a single-pole double-throw switch, adapted for use with a field winding comprising two parts with a common contact to the power supply. It is obvious that by increasing the number of relay contacts, one may obtain a relay constituting a double-pole double-throw reversing switch, useful when there is but one field winding across the end of which the field voltage may be reversibly connected.

In addition to being useful with any direct current motor the invention may be applied to the control of an alternating current motor capable of being reversed. An example of such a motor is one having a closed rotor winding and a pair of stator windings supplied with alternating currents in quadrature. Phase reversal of one of these currents reverses the rotation of the rotor. An alternating current motor of this type is shown in Fig. 7 controlled in accordance with an embodiment of the invention in which the non-polar relay used in the circuits of the preceding figures is replaced by a polarized relay; for example, one of the Western Electric 209 type which is described in United States Patent 1,680,-667, granted August 14, 1928 to A. M. Curtis. Its construction is such that the residual magnetism and hysteresis of the magnetic structure is so low that a change in the voltage of battery 23 has no harmful effect. Besides, a damping turn is not required.

The apparatus of Fig. 7 is drawn in schematic form, omitting as no longer requiring particular description the details shown in Figs. 2 to 5. For example, the control of switch arm 26 and of brush 7 from the gear train driven by the motor is indicated by the dashed lines, and potentiometers 8 and 11 are symbolically drawn. The 209 type relay is here designated 142; it has windings 15 and 16 as before, traversed respectively by the error current to be reduced to zero and by the auxiliary current which gives rise to the motor oscillations relied on to overcome the effect of friction and backlash.

From a suitable source 90 of alternating current, power is supplied through transformer 91 to motor 100. Alternating currents in guadrature are supplied to phase windings 92 and 93 of motor 100, the former winding being directly supplied from the secondary winding of transformer 91. The primary winding of transformer 91 is connected at one end to armature 12 of relay 142 and at the other end to the junction of condensers 94, 95 which, in series with each other, are shunted across phase winding 93. Contacts 17 and 18 of relay 142 are connected to the junctions of winding 93 respectively with condenser 94 and condenser 95. It is seen that the phase of the current in winding 92 is reversed by the motion of armature 12 from one to the other of contacts 17 and 18, and therewith is reversed the direction of rotation of rotor 96. Dashed lines 97 and 98 in Fig. 7 represent, respectively, collar 24 with arm 26 and shaft 6 of Fig. 2.

Winding 16 of relay 142 is shunted by resistance 101, to the extremities of which are connected contacts 27 and 28 between which switch arm 26 is oscillated, at the balance point, as in Figs. 2 to 5. Battery 23, in series with resistance 102, is connected between switch arm 26 and the mid-point of resistance 101. Here the shift of switch arm 26 from one to the other of contacts 27, 28 reverses the direction of current flow in winding 16, thus adding to or subtracting from the core magnetization of relay 142 and correspondingly shifting armature 12 between contacts 17 and 18, thereby reversing the rotation of rotor 96.

The operation of the circuit of Fig. 7 when balance is being approached keeps armature 12 and with it switch arm 26 on the respectively appropriate contact, and at balance rotor 96 oscillates as in the arrangements shown in Figs. 2 to 5. The difference is that at the balance point in the earlier figures a non-polar relay is oscillated by changes in magnetization due to a current varying above and below an intermediate value, while in Fig. 7 a normal magnetization of the relay core is alternately increased and diminished by a current reversing in direction with the oscillation of the motor. As above explained, due to the character of the magnetic structure of relay 142 the reversals of current in winding 16, even with some change in the voltage of battery 23, leave unaffected the normal magnetization and so the center of oscillation of rotor 96.

If a summing amplifier such as tube 60 shown in Fig. 6 is to be used in the control of an alternating current motor, it is preferable to use a non-polar relay rather than the polarized relay 142 of Fig. 7. This is because the output space current may be adjusted to balance the relay spring and a small change in supply voltage leaves this space current substantially unchanged.

The invention has been described in its application to the control of both direct current and alternating current servomotors. While the basic improvement is shown in Figs. 2, 6 and 7, it is obvious that any one skilled in the art may add to the arrangements of Figs. 6 and 7 the additional refinements described in connection with Figs. 3, 4 and 5. By providing a means for keeping the motor in oscillation about the balance point, which corresponds to the center of the play in the gear train, the invention minimizes the starting friction and eliminates the effect of backlash in the gears. Undesired hunting is avoided at the same time, because a small overshoot of the motor results immediately in the emergence of a reversing torque; actually the hunting is limited to the small oscillation, at balance, through the interval of backlash.

What is claimed is:

1. A system of apparatus for equalizing in magnitude a derived voltage and a given voltage comprising a first source of voltage, a relay having a magnetic core and provided with a first and a second magnetizing winding, a pair of opposed contacts and an armature reversibly operable therebetween in response to variation in magnetization of the core, means for deriving from the first source a variable voltage, said deriving means including a source of direct current voltage and a direct current motor having a rotor winding and a stator winding, the direct current voltage source being connected between the relay armature and one terminal of the rotor winding while the other terminal thereof is connected to the mid-point of the stator winding of which the terminals are individually connected to the relay contacts, whereby the rotor is driven in a direction reversing with reversal of armature operation, means for establishing in the first winding a current proportional to the difference between the derived and the given voltage thereby varying the magnetization and operating the armature to effect control of the deriving means in the direction to decrease the voltage difference, a second source of voltage, means for applying the second source to the second winding to vary the magnetization in a selected one of two opposite senses and means controlled by the deriving means and controlling the applying means in each direction of rotor driving to select that sense of variation effective to reverse the operation of the armature when the voltage difference becomes zero.

2. Means for deriving a voltage equaling a given voltage comprising a source of voltage, means for deriving from the source a variable voltage, a source of power for operating the deriving means, a relay having a magnetic core and provided with a first and a second magnetizing winding, a pair of opposed contacts and an armature operable therebetween in response to current in the first winding and reversing in response to variation in current in the second winding in the absence of current in the first winding, means for applying the source of power to control the deriving means reversibly with reversal of armature operation, means for establishing a current in the first winding proportional to the voltage difference between the variable and the given voltage thereby operating the armature to apply the source of power to operate the deriving means in the direction to reduce the voltage difference, a second source of voltage, circuit means for applying the second source to the second winding to produce therein a current variable in selected steps and means controlled by the deriving means to select in each direction of operation thereof the current step effective to reverse the armature when the voltage difference becomes zero.

3. Means for deriving a voltage equalizing a given voltage comprising a source of voltage, means for deriving from the source a variable voltage, a source of power for operating the deriving means, a relay having a magnetic core and provided with a first and a second magnetizing winding, a pair of opposed contacts and an armature operable therebetween in response to current in the first winding and reversing in response to variation in current in the second winding in the absence of current in the first winding, voltage limiting means shunting the first winding, means for applying the source of power to the deriving means reversably with reversal of armature operation, means for establishing a current in the first winding varying with the voltage difference between the variable and the given voltage thereby operating the armature to apply the source of power to operate the deriving means in the direction to reduce the voltage difference, a second source of voltage, circuit means for applying the second source to the second winding to produce therein a current variable in selected steps and means controlled by the deriving means to select in each direction of operation thereof the current step effective to reverse the armature when the voltage difference becomes zero.

4. Means for deriving a voltage equaling a given voltage comprising a source of voltage, means for deriving from the source a variable voltage, a source of power including a series resistance for operating the deriving means, a relay having a magnetic core and provided with a first and a second magnetizing winding, a pair of opposed contacts and an armature operable therebetween in response to current in the first winding and reversing in response to variation in current in the second winding in the absence of current in the first winding, voltage limiting means shunting the first winding, means for applying the source of power to the deriving means reversibly with reversal of armature operation, means for establishing a current in the first winding varying with the voltage difference between the variable and the given voltage thereby operating the armature to apply the source of power to operate the deriving means in the direction to reduce the voltage difference means controlled by the current in the first winding to short-circuit the series resistance during said operation of the deriving means, a second source of voltage, circuit means for applying the second source to the second winding to produce therein a current variable in selected steps and means controlled by the deriving means to select in each direction of operation thereof the current step effective to reverse the armature when the voltage difference becomes zero.

5. Means for deriving a voltage equaling a given voltage comprising a source of voltage, means for deriving from the source a variable voltage, a source of power for operating the deriving means, a relay having a magnetic core and provided with a first and a second magnetizing winding, a pair of opposed contacts and an armature operable therebetween in response to current in the first winding and reversing in response to variation in current in the second winding in the absence of current in the first winding, voltage limiting means shunting the first winding, means for applying the source of power to the deriving means reversibly with reversal of armature operation, means for establishing a current in the first winding varying with the voltage difference between the variable and the given voltage thereby operating the armature to apply the source of power to operate the deriving means in the direction to reduce the voltage difference, a second source of voltage, circuit means for applying the second source to the second winding to produce therein a current variable in selected steps, a first means controlled by the deriving means to select in each direction of operation thereof the current step effective to reverse the armature when the voltage difference becomes zero, and a second means controlled by the deriving means to apply the source of power with reduced efficiency when the variable voltage equals the given voltage.

6. Means for deriving a voltage equal in magnitude and opposite in sign to a sum of given voltages comprising a source of voltage of opposite sign to said sum, means for deriving from the source a variable voltage, a relay having a magnetic core and provided with at least one magnetizing winding, a pair of opposed contacts and an armature operated therebetween in response to variation in magnetization of the core, a source of power, means for applying the source of power to control the deriving means reversibly with reversal of armature operation, a thermionic vacuum tube having two input circuits and an output circuit, the output circuit including the magnetizing winding, power supply for said tube, means for applying to one input circuit the algebraic sum of the given voltages and the variable voltage thereby producing in the magnetizing winding a current proportional to said algebraic sum and operating the armature to effect operation of the deriving means in the direction to reduce the algebraic sum, a second source of voltage, means for deriving from the second source a pair of unequal voltages each opposite in sign to the variable voltage and means controlled by the first-named deriving means in each direction of operation thereof to apply to the other input circuit that voltage of said pair effective to produce reversal of armature when the algebraic sum is zero.

7. A system of apparatus for equalizing in magnitude a derived voltage and a given voltage comprising a first source of voltage, a relay having a magnetic circuit and provided with a first and a second magnetizing winding, a pair of opposed contacts and an armature reversibly operable therebetween in response to variation in magnetization of the circuit, means for deriving from the first source a variable voltage, said deriving means including an alternating current motor having a rotor and a pair of stator windings, a source of alternating voltage, means for applying the alternating voltage in fixed phase across one stator winding, means for applying the alternating voltage across the other stator winding in quadrature with the fixed phase and reversibly with reversal of armature operation whereby the motor reverses with each reversal of said operation, means for establishing in the first winding a current proportional to the difference between the derived and the given voltage thereby varying the magnetization and operating the armature to effect control of the deriving means in the direction to decrease the voltage difference, a second source of voltage, means for applying the second source to the second winding to vary the magnetization in a selected one of two opposite senses and means controlled by the deriving means and controlling the applying means in each direction of rotor driving to select that sense of variation effective to reverse the operation of the armature when the voltage difference becomes zero.

8. Means for equalizing in magnitude a given voltage and a derived voltage comprising a first source of voltage, a motor, means driven by the motor to derive from the first source a varying voltage, power supply for driving the motor, a relay having a magnetic circuit and provided with a pair of opposed contacts and an armature operating therebetween and reversing in contact therewith responsively to variation of magnetization in the magnetic circuit, said armature and contacts being arranged to apply the power supply to drive the motor reversingly with reversal of armature contact, means for applying the derived and the given voltage to vary the magnetization in the sense of the difference in magnitude of the applied voltages and controlling the armature to apply the power source to drive the motor in the direction varying the derived voltage to reduce the voltage difference, a second source of voltage, an electrical circuit supplied from the second source with voltage variable in selectable steps respectively above and below a mean value to vary the magnetization in one or in the opposite sense and means controlled by the motor driven means to select in each direction of motor drive the voltage step appropriate to reverse the armature contact in the absence of a voltage difference between the derived and the given voltage.

9. In a system of apparatus for balancing in magnitude two opposed voltages, said system including a source of power, a motor reversibly supplied with power from the source and means including a rotating shaft driven by the motor and controlling means for balancing the voltages; means for producing continuous oscillation of the shaft when the voltages are balanced comprising a relay having a magnetic circuit and provided with a pair of opposed contacts and an armature reversing from one to the other contact in response to reversing variation of magnetization in the magnetic circuit, said armature and contacts being arranged in series with the power source to reverse the power supply to the motor with reversal of armature contact, means for reversing the armature contact including means for varying the magnetization in one or the opposite sense from a mean value thereof and means controlled by the shaft in each direction of rotation thereof to operate the magnetization varying means to reverse the armature contact.

10. The combination in claim 9 with an impedance connected to said motor to reduce the excitation thereof when said voltages are balanced and contact means operable when said voltages are unbalanced to short-circuit said impedance.

11. The combination in claim 10 in which said impedance is connected in serial relationship with said motor to the power supply.

12. The combination in claim 10 in which said contact means connects said impedance in parallel relationship to a portion of the winding of said motor.

13. Apparatus for equalizing in magnitude a given voltage and a controlled voltage comprising a source of voltage, a magnetic core having a first and a second magnetizing winding, a pair of opposed contacts and an armature operable therebetween in response to variation in magnetization of the core, means for deriving the controlled voltage from the source including a series motor having a rotor winding connected to a tap on a stator winding, the ends of the stator winding being connected to said opposed contacts, an impedance connected in serial relationship with said armature and said rotor to the source of voltage, adjustable means for selecting the given voltage from the source, means for establishing in the first winding a current proportional to the difference between the given and the controlled voltage to vary the magnetization of the core to operate the armature and effect control of the motor in the direction to decrease the voltage difference, means for supplying current from the source to the second winding in a selected one of two opposite senses, means controlled by said deriving means and controlling the supplying means in each direction of rotor rotation to select that sense of variation effective to reverse the operation of the armature when the voltage difference is zero, and a relay having a winding connected in serial relationship with said first winding and a pair of make contacts connected in parallel relationship with said impedance.

14. Apparatus for equalizing in magnitude a given voltage and a controlled voltage comprising a source of voltage, a magnetic core having a first and a second magnetizing winding, a pair of opposed contacts and an armature operable therebetween in response to variation in magnetization of the core, means for deriving the controlled voltage from the source including a series motor having a rotor winding connected to the junction of two stator windings, the free ends of the stator windings being connected to said opposed contacts and the source of voltage connected between the armature and the rotor, an impedance connected to a tap in one of the stator windings, a pair of make contacts operable only by the rotation of said rotor to connect the free end of said impedance to a tap in the other stator winding, adjustable means for selecting the given voltage from the source, means for establishing in the first winding a current proportional to the difference between the given and the controlled voltage to vary the magnetization of the core to operate the armature and effect control of the motor in the direction to decrease the voltage difference, means for supplying current from the source to the second winding in a selected one of two opposite senses and means controlled by said deriving means and controlling the supplying means in each direction of rotor rotation to select that sense of variation effective to reverse the operation of the armature when the voltage difference is zero.

WILLIAM A. KNOOP.

REFERENCES CITED

The following references are of record in the file of this patent:

UNITED STATES PATENTS

| Number | Name | Date |
|---|---|---|
| 1,784,504 | Tanner | Dec. 9, 1930 |
| 2,105,598 | Hubbard | Jan. 18, 1938 |
| 2,113,436 | Williams | Apr. 5, 1938 |
| 2,259,343 | Harris | Oct. 14, 1941 |

FOREIGN PATENTS

| Number | Country | Date |
|---|---|---|
| 552,118 | Great Britain | Mar. 24, 1943 |